US006693897B1

(12) United States Patent
Huang

(10) Patent No.: US 6,693,897 B1
(45) Date of Patent: Feb. 17, 2004

(54) METHOD AND SYSTEM OF SCREENING AND CONTROL OF TELEPHONE CALLS WHILE USING A PACKET-SWITCHED DATA NETWORK

(75) Inventor: Alexander Lisheng Huang, Austin, TX (US)

(73) Assignee: SBC Technology Resources, Inc., Austin, TX (US)

(*) Notice: Subject to any disclaimer, the term of this patent is extended or adjusted under 35 U.S.C. 154(b) by 101 days.

(21) Appl. No.: 09/709,761

(22) Filed: Nov. 10, 2000

(51) Int. Cl.[7] ............................................. H04L 12/66
(52) U.S. Cl. ................................... 370/352; 379/88.12
(58) Field of Search ............................... 370/352, 353, 370/354, 355, 356, 259, 357, 358, 401, 410, 271; 379/210, 211, 215, 114, 118, 88.12, 88.17, 88.19, 88.2, 88.26

(56) References Cited

U.S. PATENT DOCUMENTS

| | | | |
|---|---|---|---|
| 4,995,074 A | | 2/1991 | Goldman et al. |
| 5,533,102 A | | 7/1996 | Robinson et al. |
| 5,724,412 A | | 3/1998 | Srinivasan |
| 5,805,587 A | | 9/1998 | Norris et al. |
| 5,809,128 A | | 9/1998 | McMullin |
| 5,946,381 A | | 8/1999 | Danne et al. |
| 5,946,386 A | | 8/1999 | Rogers et al. |
| 5,982,774 A | | 11/1999 | Foladare et al. |
| 5,982,870 A | | 11/1999 | Pershan et al. |
| 5,999,965 A | | 12/1999 | Kelly |
| 6,078,581 A | | 6/2000 | Shtivelman et al. |
| 6,097,795 A | | 8/2000 | Ungruh et al. |
| 6,144,644 A | * | 11/2000 | Bajzath ........................ 370/259 |
| 6,215,790 B1 | * | 4/2001 | Voit .............................. 370/401 |
| 6,307,930 B1 | * | 10/2001 | Mayer .................... 379/215.01 |
| 6,317,488 B1 | * | 11/2001 | DePond .................... 379/93.35 |
| 6,353,611 B1 | * | 3/2002 | Norris .......................... 370/356 |
| 6,353,660 B1 | * | 3/2002 | Burger ..................... 379/88.17 |
| 6,366,661 B1 | * | 4/2002 | Devillier ................. 379/211.01 |
| 6,377,668 B1 | * | 4/2002 | Smock .................... 379/142.08 |
| 6,400,812 B1 | * | 6/2002 | Svedberg ................ 379/114.14 |
| 6,404,764 B1 | * | 6/2002 | Jones .......................... 370/352 |
| 6,404,870 B1 | * | 6/2002 | Kia ......................... 379/144.01 |

OTHER PUBLICATIONS

Siemens telcomreport, "An Internet Boost for Carrries", Aug. 10, 2000, 2 pages.

* cited by examiner

Primary Examiner—Douglas Olms
Assistant Examiner—Ricardo M. Pizarro
(74) Attorney, Agent, or Firm—Brinks Hofer Gilson & Lione

(57) ABSTRACT

A Call Alerting and Control System is provided in a communication environment to allow an Internet user ("user") approximately real-time monitoring of information about an incoming call from a calling party while maintaining a connection with the Internet. The monitored information can include the calling party's name and telephone number. The system could also allow the user to provide an answering machine-type message to the calling party and the user to listen to the calling party's response to the message while still connected to the Internet. The system can further allow the user to reroute, answer or otherwise treat the incoming call while, at the user's discretion, either maintaining or disconnecting a connection to the Internet.

16 Claims, 4 Drawing Sheets

METHOD AND SYSTEM OF SCREENING AND CONTROL OF TELEPHONE CALLS WHILE USING A PACKET-SWITCHED DATA NETWORK

FIELD OF THE INVENTION

This invention relates to a system and method for a user to screen and control an incoming telephone call while the user is connected to a packet-switched data network such as the Internet.

BACKGROUND

Many Internet users today connect their computers to the Internet over their telephone lines. As more information and services are available over the World Wide Web on the Internet, users spend more time connected to the Internet and thus occupying their telephone lines. If an Internet user has only a single telephone line, callers trying to reach such a user can encounter a busy signal for extended periods of time. Available Call Waiting services that typically allow a subscriber to answer an incoming call from a second party while conversing with a first party cannot be used while a user is connected to an Internet call. The Internet connecting software requires that the call waiting service be temporarily deactivated. Thus, the user is unaware of the incoming call.

Some systems today allow a user to view information about an incoming call when the user is connected to the Internet. Such information, however, is often limited. Information about the incoming call is often unavailable because the caller is out of the user's area or the caller has disabled the identification function. To answer the call, the user must disconnect from the Internet, and the call may turn out to be unimportant relative to the user's Internet session. Or, the user may use an answering service to prompt the caller of the incoming call to leave a message. The user will be unable to review, however, the incoming message until some time after the Internet session is discontinued.

Thus, there is a need for a system that addresses the above-mentioned problems.

BRIEF SUMMARY

The present invention is defined by the following claims, and nothing in this section should be taken as a limitation on those claims. By way of introduction, the preferred embodiment described below includes a Call Alerting and Control System (CACS) that manages incoming calls from a calling party to an Internet user ("user") while the user maintains a connection to the Internet. CACS allows the user approximately real-time monitoring of information about an incoming call from a calling party. The information includes, for example, data about the calling party, and/or an opportunity for the user to listen to a calling party's response to an answering machine type message. In addition, CACS allows the user to listen to caller's voice before making further decisions about handling the call.

CACS operates within a communication environment. The communication environment includes a telephone network that receives incoming calls and determines whether the intended communication line is busy. If the telephone line of the user is busy, a Service Switching Point (SSP) included in the telephone network obtains instructions from the Service Control Point (SCP) for the incoming call. The SCP determines whether the user is connected to the Internet or the Internet-like packet-based data network. The SCP instructs the SSP to transfer the incoming call to a Gateway System if the user is connected to the Internet.

The CACS includes the Gateway System and a Client System. The Gateway System instructs the Client System to notify the user of the incoming call and prompts the user to choose a call handling option. For example, call handling options include the option of listening to the calling party who leaves a message while the user maintains a connection with the Internet. Thereafter, CACS manages the incoming call in accordance with a user-selected call handling option or with a preset default option after timeout period elapses for the user to indicate a selected option.

Further aspects and advantages of the invention are discussed below in conjunction with the preferred embodiments.

TABLE OF ACRONYMS

The following table aids the reader in determining the meaning of the several acronyms used to describe the embodiments:

CACS=Call Alerting and Control System.
CS=Client System.
DSL=Digital Subscriber Line.
GS=Gateway System.
IETF=Internet Engineering Task Force.
ISDN=Integrated Services Digital Network.
ISP=Internet Service Provider.
LIDB=Line Information Database.
PDA=Personal Digital Assistant.
RAS=Remote Access Server.
RTP=Real-time Transport Protocol.
SCP=Service Control Point.
SIP=Session Initiation Protocol.
SSP=Service Switching point.
SS7=Signaling System 7.
TCP/IP=Transmission Control Protocol/Internet Protocol.
VoIP=Voice over Internet Protocol.

DETAILED DESCRIPTION OF THE PREFERRED EMBODIMENTS

A Call Alerting and Control System (CACS) is provided in a communication environment that allows an Internet user ("user") approximately real-time monitoring of information about an incoming call from a calling party while maintaining a connection to the Internet. The information includes, for example, data about the calling party, such as the calling party's name and telephone number, and an opportunity for the user to listen to a calling party's response to an answering machine-like messaging system while the user is still connected to the Internet. CACS also allows the user to reroute, treat or otherwise answer the incoming call by, at the user's choice, either maintaining or disconnecting the user's connection to the Internet.

For simplicity of description, the term Internet is sometimes used herein where the more general term of packet-switched data network could be otherwise used, but the invention is applicable to both systems. Moreover, the term telephone line is sometimes used herein, where the more general term of communication line could be otherwise used. The controlled telephone line can be a line shared by telephone and data network access services, or can be another telephone line, or other lines, physically or logically separate from that used by the data network access.

Figure 1:
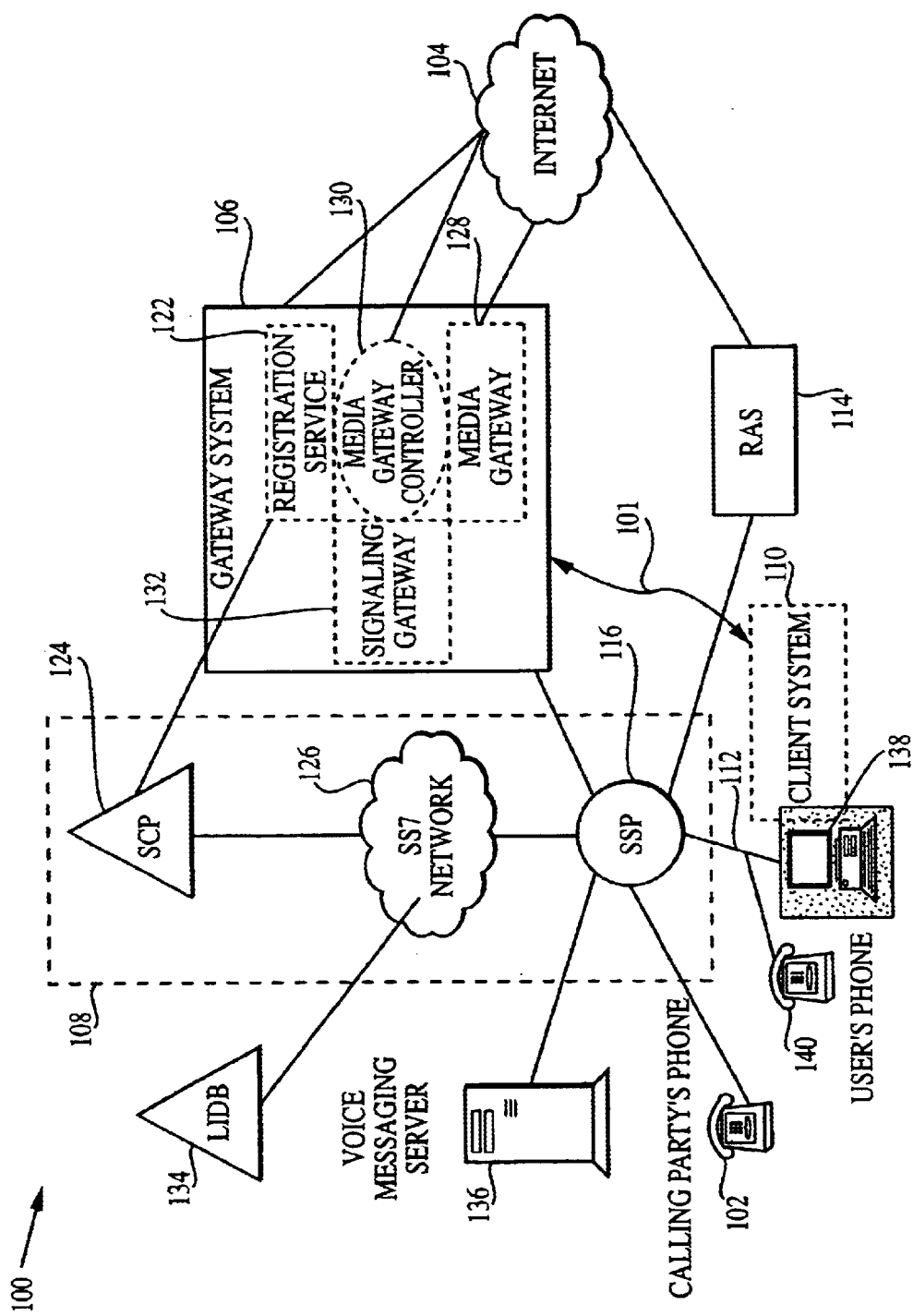
FIG. 1 is a block diagram illustrating a Call Alerting and Control System (CACS) in a communication environment that handles calls to an Internet user, according to a preferred embodiment.

FIG. 1 illustrates a communication environment 100 including a CACS 101 that allows a user to monitor and manage in real time an incoming call from a calling party 102 while maintaining a connection with the Internet 104, or other packet-based data network. CACS 101 includes a Gateway System 106 that processes and controls incoming calls. The Gateway System 106 receives the incoming call from a telephone network 108 that forwards the incoming call to the Gateway System 106 when the user is connected to the Internet 104. The user connects to the Internet 104 via a computer 138 and user's telephone line 112. The CACS 101 also includes a Client System 110, for example, a Client System application 300 described in FIG. 3, that resides on user's computer 138.

The user connects to the Internet 104 via a remote access server (RAS) 114, also referred to as an Internet Service Provider (ISP). The telephone line 112 is used for the Internet access via a modem connection. When the user wants to access the Internet 104, the user's computer 138 dials for the RAS 114. A Service Switching Point (SSP) 116 included in the telephone network 108 routes the call from the computer 138 to the RAS 114 via the telephone line 112.

The Client System 110 that runs in the background after user's computer starts up, is activated when the user accesses the Internet 104. The Client System 110 registers with the registration service 122 included in the Gateway System 106 when the user begins an Internet session. The registration service 122 records that the user is connected to the Internet 104. The Client System deregisters, when possible, with the registration service 122 when the user disconnects from the Internet 104. Various mechanisms can be used to register or deregister the Client System 110 from the registration service 122 including the user manually registering or deregistering upon initiation or termination of the Internet connection and/or automatic registration or deregistration by the Client System 110 upon signing-on or exiting the Internet. Other methods for deregistering the Client System 110 could also be used, such as the Gateway System 106 periodically polling the Client System 110 to determine if the Internet access has ended.

After the calling party 102 calls the user, if the telephone line 112 is busy, the SSP 116 queries a Service Control Point (SCP) 124 included with the telephone network 108 to determine how to handle the incoming call. The SCP 124 accesses registration information from the registration service 122 to determine if the Client System 110 is registered as being connected to the Internet 104. Based on the registration information the SCP 124 instructs the SSP 116 on how to process the incoming call. For example, if the user is not connected to the Internet, the SSP 116 can supply a busy signal to the calling party 102 or notify the user of the incoming call using a Call Waiting system as is known in the art.

Alternative to the Registration Service 122, the status of the user as connected to the Internet 104 may be relayed to, and hosted locally, by the SCP 124. Thereafter, when a call arrives the SCP 124 does not incur delay to query the Registration Service 122 in the Gateway System 106. When the user is disconnected from the Internet, the Registration Service 122 updates the status of the SCP 124.

If the registration information indicates that the user is connected to the Internet, the SCP 124 instructs the SSP 116 to route control signals of the incoming call via a signaling system network (SS7) 126 to a media gateway controller 130. The media gateway controller 130 dispatches calls coming into the Gateway System 106. A signaling gateway 132 connects between the media gateway controller 130 and the SS7 network 126 to convert SS7 protocol control signals to a protocol understood by the Gateway System 106, such as Transmission Control Protocol/Internet Protocol (TCP/IP), Stream Control Transmission Protocol (SCTP), or other network protocol.

In addition to sending the control signals, the SSP 116 opens a voice path of the incoming call to the media gateway 128. Some interactions may take place between the Gateway System 106 and the caller 102 before the user is alerted. For example, the Gateway System 106 can prompt the calling party 102 to state his or her name if that can not be derived from the calling party number or if the calling party number is restricted in the incoming call signaling. Those skilled in the art will appreciate that the Gateway System 106, including the media gateway 128, the registration service 122, the media gateway controller 130, and the signaling gateway 132, can be implemented in a single physical system or as separate systems depending on the design criteria.

Those skilled in the art will appreciate that although the system of FIG. 1 illustrates an SCP 124, a SSP 116, and a telephone line 112 as being components of one type of telephone system 108, the CACS 101 may function in conjunction with other types of telephone systems. For example, by replacing the SCP 124, SSP 116, and telephone line 112 with a Home Location Register, a Mobile Switching Center, and a Radio connection, respectively, the telephone network can be a wireless network. Also, the user's telephone 140 can be a wireless telephone, and the computer 138 a portable computer of varying forms. While present radio connections may not provide the same voice quality and data network access of a present wired connection, advancing technologies could soon raise the bandwidth of the radio connection, and optimize the utilization of the radio connection.

Figure 2:
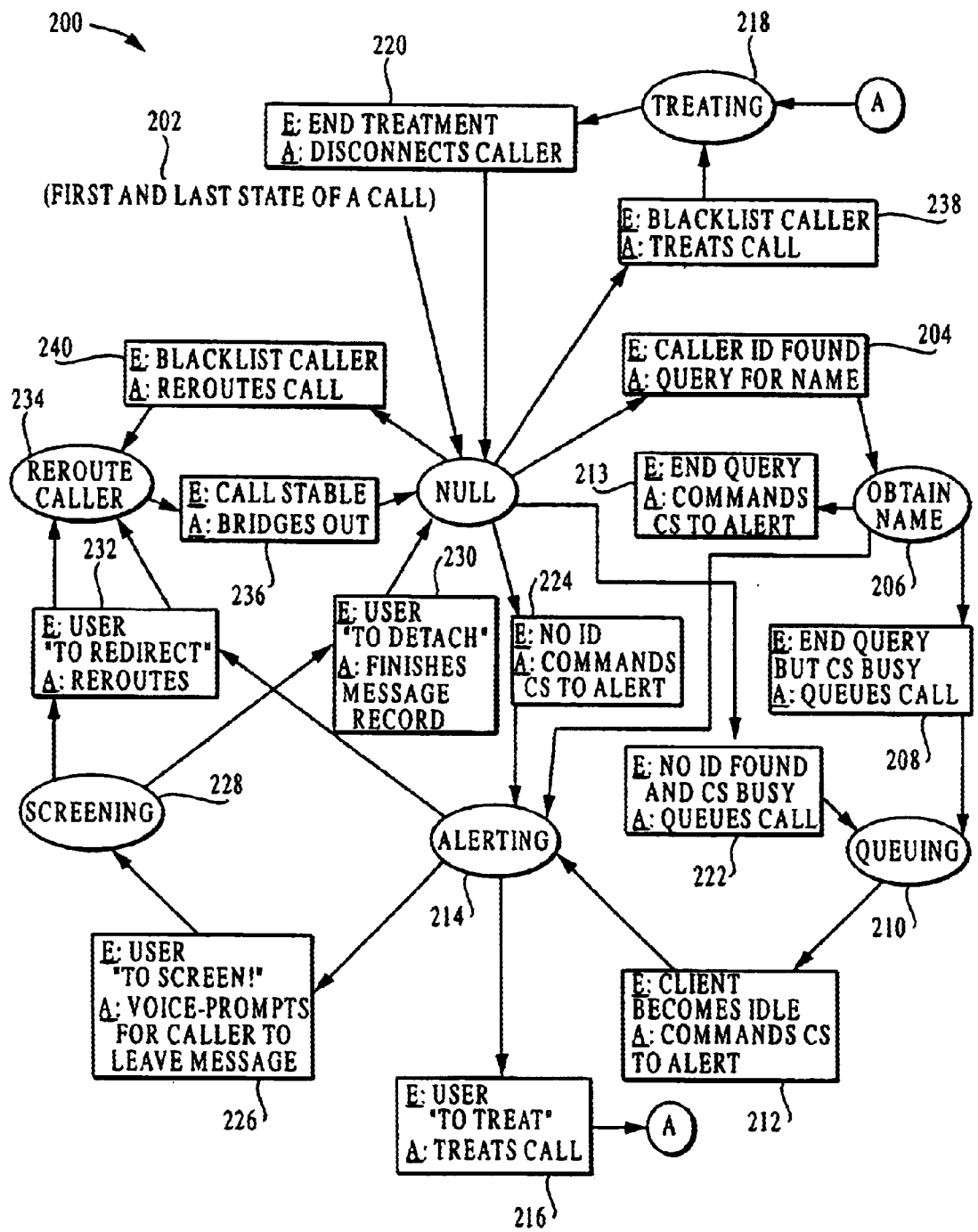
FIG. 2 is a high-level state diagram illustrating a Gateway System application used with a Gateway System of the CACS of FIG. 1, according to a preferred embodiment.

FIG. 2 shows a state diagram illustrating an exemplary Gateway System application 200 included with the Gateway System 106 (FIG. 1) of the CACS 101 to handle incoming calls. The application 200 includes a program or process that can be implemented with software residing mostly in the Media Gateway Controller 130. The Gateway System application 200 remains in the null state 202 regarding to a specific user until the Gateway System 106 receives an incoming call for the calling party 102. As described above, the Gateway System 106 receives an incoming call when the communication line 112 of the Client System 110 is busy and the registration service 122 lists the user as being connected to the Internet 104.

At block 204, if the Gateway System application 200 determines that the incoming call from a calling party 102 includes a calling party identification, the Gateway System 106 queries a line information database (LIDB) 134 (FIG. 1) to acquire more calling party information, including the name and optionally the address of the calling party 102. The query ends when the calling party information is obtained or a null value is obtained. The null value may indicate the LIDB 134 does not contain calling party information for the calling party 102, or it is too slow to meet the timing of the query.

Those skilled in the art will appreciate that the LIDB 134 can produce the calling party information according to a given calling party's telephone number, unless that number is not associated with a telephone user, such as a street payphone. In that case, the Gateway System application 200 may at least derive from a Gateway System database the location information of the origin of the call, such as calling city and state. The LIDB 134 can be a remote system that connects with the Gateway System 106 via the signaling gateway 132 and the SS7 network 126. Alternatively, historical LIDB 134 query results can be cached in the Gateway System 106 for a certain period of time to improve the performance. While the Gateway System 106 obtains the calling party information, the Gateway System application 200 remains in an obtain-name state 206 until the query has ended.

Calling party information, whether received from the call signaling, obtained from LIDB 134, the Gateway System's 106 internal cache, or information recorded from the caller, is sent to the Client System 110 when the Client System 110 can receive the information. At block 208, the Client System 110 may be busy in an alerting state or a screening state, described below, for another call. While the Client System 110 is busy in the alerting state or the screening state, the Gateway System application 200 remains in the queuing state 210. The Gateway System 106 may play a general announcement to the calling party 102 to advice the calling party 102 of a waiting period in case of a queuing occurs that becomes noticeable to the calling party 102.

At block 212, when the Client System 110 becomes available, or at block 213 or 214, if the Client System 110 was available at the end of the query or if no query is possible, the media gateway controller 130 in the Gateway System 106 prompts the Client System 110 to alert the user of the incoming call 214. As part of the alerting process 214, the media gateway 128 can send, or stream, the collected spoken calling party name to the Client System 110 for play back, if applicable. The Client System 110 preferably initiates a popup window to display the calling party information. For example, in a Microsoft Windows environment, the Internet user can be notified of the incoming call with a popup window that displays the calling party information and may also sound a beep to alert the user. The calling party's voice, if applicable, can be played at the same time.

The popup window can also prompt the user to select a call handling option within a determined time. Call handling options include a selection to further screen the incoming call, to redirect the incoming call to a certain destination, to answer, the incoming call, or to otherwise treat the incoming call. If the user does not respond to the popup window within a determined time, the Gateway System automatically initiates a user-preset option, such as to route the incoming call to a voice messaging server 136 (FIG. 1) so that the calling party 102 can leave a message.

At block 216, if the user instructs the Gateway System 106 to treat the incoming call, the application 200 enters the treating state 218. In the treating state 218, the Gateway System 106 terminates the call with or without a voice announcement or a special audible tone played to the calling party 102. To better treat the incoming call, the user can preferably select the announcement to play from a list of available announcements displayed on the popup window. The selected announcement can be a caller specific announcement to be played to particular calling parties or a general announcement to be played to a group of, or all, calling parties. The user can record the announcements directly with the Gateway System 106 or with the Client System 110 to be later transferred to the Gateway System 106. When the incoming call is disconnected, the Gateway System application 200 returns to the null state 202 until the next call arrives.

At block 222, if the next incoming call includes no calling party identification and the Client System 110 is busy, the Gateway System application 200 queues the call and enters the queuing state 210 until the Client System 110 becomes available. In the queuing state 210, the Gateway System 106 can prompt the calling party to speak his or her name for recording.

At block 226, if the user decides to screen the incoming call, the media gateway 128 plays an announcement that prompts the calling party 102 to leave a message. The announcement is preferably a request for the calling party 102 to record a short message including the calling party's name and a brief description of the intended topic of conversation. During a screening state 228, the user can listen to the calling party's response via a packet-switched telephony protocol, for example, in the case of Internet, a Voice Over Internet Protocol (VoIP) such as Real-time Transport Protocol (RTP). The connection is preferably a one-way connection allowing the user to listen to the calling party but not the calling party to the user. The connection can optionally be changed to a two-way connection at a later stage of the incoming call. While various VoIP protocols can be selected, exemplary VoIPs include Session Initiation Protocol (SIP) specified by the Internet Engineering Task Force (IETF) and H.323 specified by the International Telecommunication Union ITU. The selected protocol converts a circuit-switched voice connection used by the telephone network 108 to a packet switched voice connection that the user can hear while maintaining a connection with the Internet.

At block 230, upon hearing the calling party's response to the announcement, the user can detach from the incoming call, for example, by choosing the detach call handling option from the popup window with an input device such as a keypad or a mouse of the Client System 110. If the user decides to detach from the incoming call, the Gateway System 106 preferably disconnects the VoIP connection between the Media Gateway 128 and the Client System 110. The Gateway System 106 continues to record the calling party's message for later review by the user and maintains the user's connection to the Internet. The recorded message along with calling party information and a timestamp can be transferred to user's messaging system, if desired and configured by the user. Thereafter the Gateway System application 200 remains in the null state regarding this user 202 until the Gateway System 106 receives the next incoming call for this user.

Alternatively, at block 232, the user can redirect the incoming call during screening the call at state 228, or redirect the incoming call after being alerted of the call during the alerting state 214. When the Gateway System 106 redirects the call, the Gateway System application 200 enters in the reroute caller state 234. Depending on the content of the calling party's information and/or message, the user may redirect the incoming call by forwarding the call to an alternate communication line, such as the telephone number of a colleague or a fax machine (not shown). An alternative destination for redirecting the incoming call is to send the incoming call to the voice messaging server 136 and disconnect the call from the user without disconnecting the user's Internet connection at block 220.

To prompt the calling party 102 to leave a message, the messaging server 136 plays a recorded announcement. Alternatively, the message can be left with the Gateway System 106. To better prompt the caller, the user can preferably select the announcement from a list of available announcements displayed on the popup window. The selected announcement can be a caller specific announcement to be played to particular calling parties or a general announcement to be played to some group of, or all, calling parties. The user can record the announcements directly with the Gateway System 106 or with the Client System 110 to be later transferred to the Gateway System 106.

At block 236, after redirecting the incoming call, the incoming call disconnects from calling party 102 and the Internet connection is maintained.

The user can also answer the incoming call. There are various ways to connect the user to the incoming call, including using the Gateway System 106 to connect the incoming call to the user via VoIP, or by first disconnecting the Internet connection and then connecting the call to user's telephone through the SSP 116 and the telephone line 112. If the incoming call is connected via VoIP, the incoming call includes circuit switched connections from the telephone network 108 to the Gateway System 106 and two-way packet switched connections from the Gateway System 106 to the Internet 104, to the RAS 114, to the SSP 116 and to the Client System 110.

Alternatively, if the user chooses to disconnect from the Internet and answer the incoming call using the user's telephone 140 (FIG. 1), the connection between the user and the calling party 102 can be an all circuit switched connection. After the user chooses to answer the call, the Gateway System 106 commands the Client System 110 to disconnect from the Internet and informs the SCP 124 that the user's communication line 112 is no longer busy. Thereafter, the Gateway System 106 routes back the call to the telephone network 108 and further back to the user's telephone line 112. Typically, an all circuit switched connection provides a better quality connection between the calling party 102 and the user than a system that includes VoIP packet switching.

In addition to the above, in a preferred embodiment the Gateway System 106 can also process an incoming call and automatically handle the incoming call upon receipt, before notifying the user. In a preferred embodiment, to process the incoming call, the Gateway System 106 determines whether a telephone number or other criteria about the incoming call is included in a user-defined list. User defined lists include a blacklist (e.g., undesired callers) and a white list (e.g., callers that may need immediate circuit-switched call connections) previously established by the user.

At block 238, if the Gateway System 106 determines that a telephone number of the incoming call is included in a treating portion of the blacklist, the Gateway System application enters the treating state 218 to automatically treat the call, for example, by disconnecting the call. Before disconnecting the call, the Gateway System 106 may or may not play a terminating announcement. At block 240, if the Gateway System 106 determines that the incoming call number is included in a reroute portion of the blacklist, the Gateway System 106 can automatically reroute the incoming call 234, for example, by routing the incoming call to an alternate destination, such as to the telephone number of a colleague, or a messaging server 136. The treating and rerouting operations may occur automatically, with or without the user being notified.

In addition, the user can establish a white list of incoming calls that should be directly connected to the user. When the Gateway System 106 determines that a call is a white list call, the Gateway System 106 commands the Client System 110 to disconnect from the Internet and informs the SCP 124 that the user's communication line 112 is no longer busy. Thereafter, the incoming call is routed to user via telephone network 108 and user's telephone line 112.

Alternatively, the calling party 102 can bypass the processing and screening processes described above and act as a white list caller, by entering a pass code obtained in advance from the user. The calling party 102 can enter the pass code, for example, by using the number pad on the calling party's telephone. If the Gateway System 106 receives the pass code, the Gateway System 106 can command the Client System 110 to disconnect from the Internet so that the incoming call can be placed. Alternatively, the VoIP can be used to connect the incoming call with the user via a two-way communication, for example, depending on the entered pass code. After the Gateway System 106 has processed the incoming call, if the call was not automatically treated 218, rerouted 234 or answered, the Gateway System 106 informs the Client System 110 of the incoming call as described herein.

Figure 3:
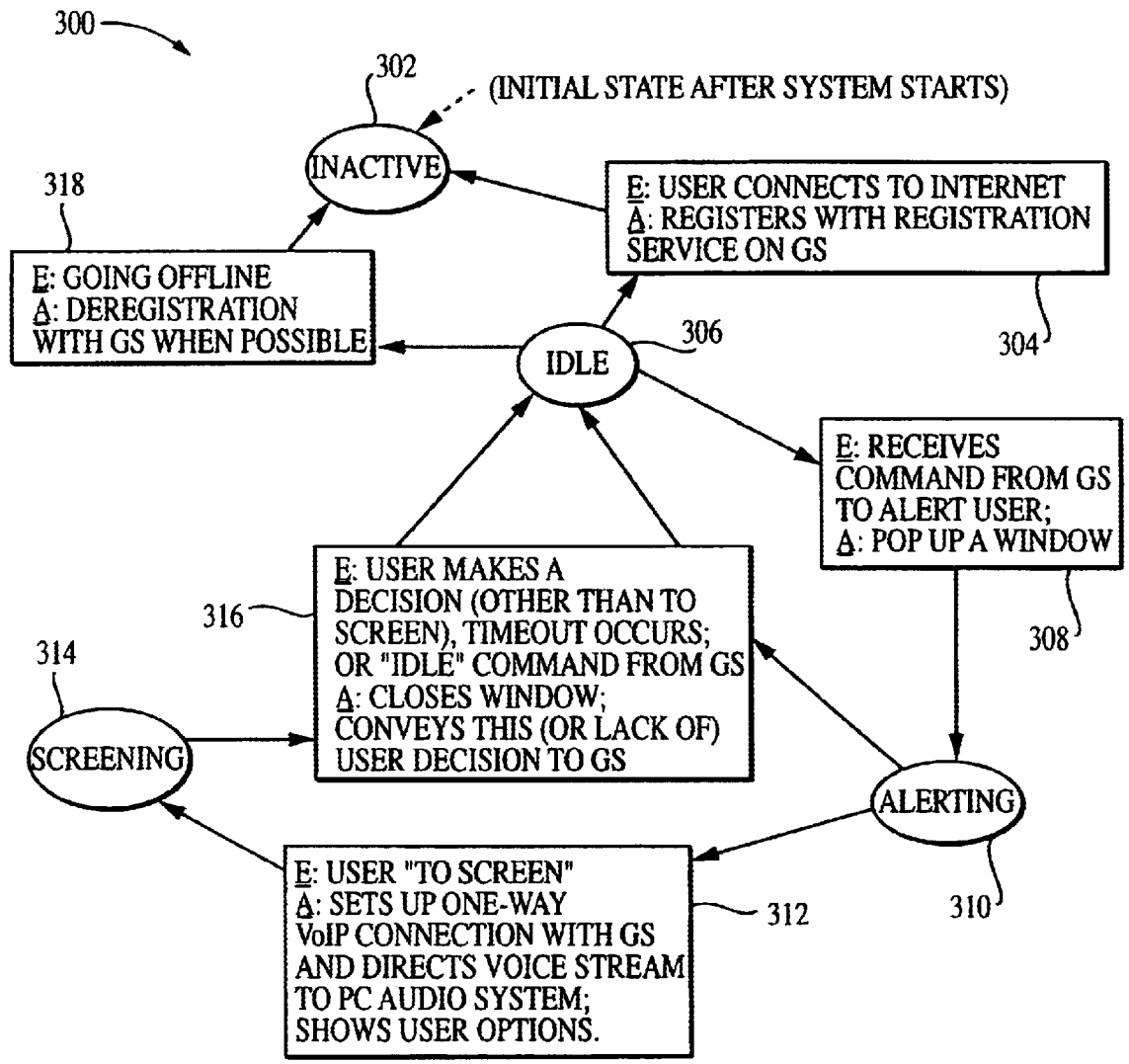
FIG. 3 is a high-level state diagram illustrating a Client System application used with a Client System of the CACS of FIG. 1, according to a preferred embodiment.

To notify the user of the incoming call and provide to the user with an interface for screening and controlling the call, the Client System 110 includes a Client System application 300, a preferred embodiment of which is illustrated in FIG. 3. An initial state of the Client System application 300 includes an inactive state 302, and the Client System application 300 remains in the inactive state 302 until an event occurs, such as the event of the user connecting with the Internet 104. At block 304, after the user connects with the Internet 104, the Client System application 300 either automatically registers the Internet connection with the Gateway System 106, or the user manually registers with the Gateway System 106. Thereafter, the Client System application 300 remains idle 306 until the Client System application 300 receives a command from the Gateway System 106.

At block 308, when the Gateway System 106 commands the Client System application 300 to alert the user of an incoming call, the Client System application 300 notifies the user of the incoming call. For example, a popup window is displayed on the monitor of user's computer 138 that contains the Client System 110. The popup window alerts the user of the incoming call 310 and shows the user information about the incoming call, such as a name and telephone number associated with the incoming call, or in lieu of a name, the calling location such as a city name. Preferably, the Client System 110 displays whatever information the Gateway System 106 provides. Also, the Gateway System 106 may establish a one-way VoIP connection with the media gateway 128 to play back a spoken name by the caller and earlier recorded by the Gateway System 110. If no information about the incoming call is available, the popup window can notify the user of that situation. The popup window also displays incoming call handling options to the user, such as whether the user would like the call rerouted or otherwise treated, and a timeout indicator to indicate to the user the time in which the user can choose an option.

At block 312, if the user decides to further screen the incoming call, the Client System application 300 enters the screening state 314. In the screening state 314, the Client System application 300 initiates a one-way VoIP connection from the calling party 102 to the user. The Client System application 300 establishes the one-way VoIP connection via the Gateway System 106, and utilizes an audio system of the computer 138 that allows the user to listen to the calling party's message contemporaneous with the calling party 102 leaving the message. The Client System 110 displays the call handling options to the user while the user listens to the incoming call. The call handling options include allowing the user to reroute, answer or otherwise treat the incoming call, or to detach from the incoming call.

At block 316, whether the Client System application 300 is currently in the screening state 314 or the alerting state 310, the popup window preferably closes after the user chooses a call handling option to reroute, answer, treat, or detach from, the call. The popup window also closes after a timeout occurs, i.e., when the user has not chosen an option within a determined time period, which is regarded as detaching from the call. The popup window also closes after the Gateway System 106 sends an idle command to the Client System application 300 that indicates, for example, the calling party 102 has hung up. Thereafter, the Client System application 300 enters the idle state 306.

When the user enters a process to disconnect from the Internet, as controlled by the user or initiated by the Gateway System 300, the Client System application 300 preferably deregisters with the Gateway System 106, and enters the inactive state 302 until the next time the user connects with the Internet.

Figure 4:
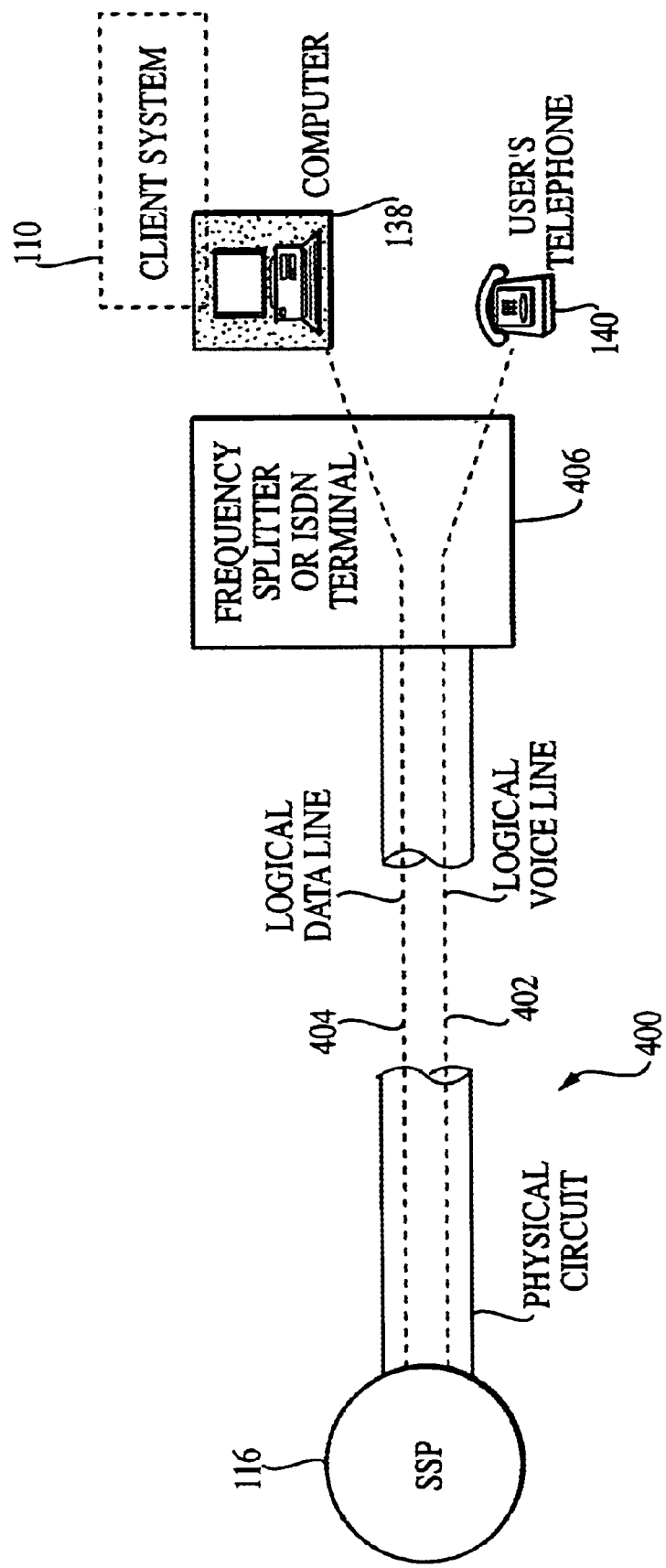
FIG. 4 illustrates an exemplary communication circuit including logically separate voice and data lines.

FIG. 4 illustrates another type of communication circuit 400 that supports multiple frequency bands and/or multiple digital channels. The communication circuit 400 supports separate logical voice line(s) 402 and a data line 404, such as in case of a digital subscriber line (DSL) or an integrated services digital network (ISDN) line. In accordance with the process described above, the data line 402 can provide screening and control for the voice line(s) 404. The communication circuit 400 connects between the SSP 116 and a frequency splitter or ISDN terminal 406 to provide for a separate logical data line to the computer 138 (FIG. 1) and a separate logical voice line to the user's telephone 140. Unlike the single-channel telephone line 112, a potential conflict may not exist between the usage of voice and data communication competing for the same telephone line 112. The user, however, may still want to screen and/or control separate voice line(s) 402 from the data line 404. Therefore, the above described system and method allow the user to specify, through the Client System 110, the voice line(s) 402 to be included in the screening and control.

The Client System 110 preferably reports a user specified configuration to the Gateway System 106 that then notifies the SCP 124 of the configuration for controlling the SSP 116. An unconditional forwarding service may be activated for the voice line(s) 402. Therefore, calls for the voice line(s) 402 can be forwarded to the Gateway System 106 and screening and control can be performed over the data line 404. Subsequently, if the user decides to answer the call over the voice line(s) 402, then the Gateway System 106, again working through SCP 124 and SSP 116, overrides the unconditional forwarding service of the voice line(s) 402, and reroutes the call to the user via the voice line 402.

As an alternative to overriding the unconditional call forwarding service, the unconditional forwarding service can be turned off for the voice line(s) 402 and the call rerouted to the user. Thereafter, the SCP 124 can queue up a transaction to turn the voice line(s) 402 back to unconditional forwarding. Otherwise, the Client System 110 can pop up a window reminding the user to re-configure the voice line(s) 402 to the screening and control status by unconditional forwarding. The remaining application logic for screening and controlling separate voice line(s) 402 follows the application logic described above for a shared telephone line. The aforementioned method for screening and control of a separate logical voice lines from a logical data line also applies to the situation where the user uses multiple physical circuits for simultaneous voice and data communications.

While the invention has been described above by reference to various embodiments, it will be understood that many changes and modifications can be made without departing from the scope of the invention. It is therefore intended that the foregoing detailed description be understood as an illustration of the presently preferred embodiments of the invention, and not as a definition of the invention. It is only the following claims, including all equivalents, which are intended to define the scope of this invention.

I claim:

1. A method for managing incoming calls from a calling party to a communication line of a user, where the user can be connected to a packet-based data network, the method comprising:

receiving an incoming call via a telephone network, wherein the telephone network includes a service control point, a service switching point and a gateway system;

determining with information from the gateway system whether the user is connected to the packet-based data network;

if the user is connected to the packet-based data network, prompting the user to choose at least one call handling option, where the call handling option includes rerouting the incoming call to an alternate communication line, wherein the alternate communication line differs from a communication line of the incoming call, allowing a one-way voice connection to be established by the service switching point to the user to allow the user to listen to the calling party contemporaneous with the calling party leaving a message and while the user maintains a connection with the packet-based data network, without answering the incoming call; and thereafter, allowing a two-way voice connection to be established with the user via the service switching point if the user chooses to answer the incoming call.

2. The method of claim 1 where the call handling option includes automatically treating the incoming call in accordance with an identity of the calling party.

3. The method of claim 2 where treating the incoming call further includes sending the incoming call to a voice messaging server.

4. The method of claim 3 where treating the incoming call further includes disconnecting the incoming call.

5. The method of claim 2 where the call handling option includes answering the incoming call.

6. The method of claim 5 where answering the incoming call includes connecting the calling party to the user over the packet-based data network via a two-way Voice Over Internet Protocol (VoIP).

7. The method of claim 5 where answering the incoming call further includes:

disconnecting the packet-based data network connection; and connecting the calling party to the user via a switched voice connection.

8. The method of claim 1 further including processing the incoming call before notifying the user.

9. The method of claim 8 where the processing includes automatically rerouting the incoming call to an alternate communication line in accordance with an identity of the calling party.

10. The method of claim 8 where the processing includes automatically connecting the incoming call to the user in accordance with an identity of the calling party.

11. A call alerting and control system for managing incoming calls from a calling party to a communication line of a user, where the user can be connected to a packet-based data network, the system comprising:

a Client System operable to notify the user of an incoming call;

a Telephone Network, wherein the Telephone Network includes a Service Control Point, a Service Switching point and a Gateway System;

wherein the Client System is able to prompt the user to choose at least one call handling option after the Gateway System receives the incoming call, where the call handling option includes rerouting the incoming call to an alternate communication line, wherein the alternate communication line differs from a communication line of the incoming call; and wherein the Gateway System is able to establish a one-way voice path from the calling party to the Client System through a data network connection, which allows the user to listen to the calling party leaving a message while the user maintains a connection to the packet-based data network; and further wherein the gateway System processes the incoming call before notifying the user, to automatically reroute the incoming call to said alternate communication line or connect the incoming call to the user in accordance with an identity of the calling party.

12. The system of claim 11 wherein the Gateway System and the Client System manage the incoming call in accordance with a user selected call handling option or after a timeout period for the user to handle the call has elapsed.

13. The system of claim 11 where the call handling option includes the option to treat the incoming call.

14. The system of claim 11 where the call handling option includes the option of listening to the calling party leave a message while the user maintains a connection with the packet-based data network.

15. The system of claim 11 where the call handling option includes the option to answer the incoming call.

16. The system of claim 15 where, when the user chooses the option to answer the incoming call, the Gateway System disconnects the data network connection and connects the calling party to the user via a switched voice connection on the system.

* * * * *

UNITED STATES PATENT AND TRADEMARK OFFICE
CERTIFICATE OF CORRECTION

PATENT NO.    : 6,693,897 B1
DATED         : February 17, 2004
INVENTOR(S)   : Huang It is certified that error appears in the above-identified patent and that said Letters Patent is hereby corrected as shown below:

<u>Title page,</u>
Item [*] Notice, should read:
-- Subject to any disclaimer, the term of this patent is extended or adjusted under 35 U.S.C. 154(b) by 52 days --.

Signed and Sealed this

Eighteenth Day of January, 2005

JON W. DUDAS
*Director of the United States Patent and Trademark Office*